US008156416B2

(12) United States Patent
St. Jacques, Jr. et al.

(10) Patent No.: US 8,156,416 B2
(45) Date of Patent: Apr. 10, 2012

(54) SECURING PRINTED OUTPUT (75) Inventors: Robert St. Jacques, Jr., Fairport, NY (US); Nathaniel G. Martin, Rochester, NY (US); Kevin M. Hall, Rush, NY (US)

(73) Assignee: Xerox Corporation, Norwalk, CT (US)

( * ) Notice: Subject to any disclaimer, the term of this patent is extended or adjusted under 35 U.S.C. 154(b) by 1003 days.

(21) Appl. No.: 12/118,898

(22) Filed: May 12, 2008

(65) Prior Publication Data

US 2009/0279143 A1 Nov. 12, 2009

(51) Int. Cl.
*G06F 17/00* (2006.01)
(52) U.S. Cl. .......................................... 715/200; 715/255
(58) Field of Classification Search .................. 715/200, 715/255
See application file for complete search history.

(56) References Cited

U.S. PATENT DOCUMENTS

| | | | |
|---|---|---|---|
| 6,032,004 A | 2/2000 | Mirabella, Jr. et al. | |
| 6,931,420 B1* | 8/2005 | Silvester et al. | 1/1 |
| 7,992,084 B2* | 8/2011 | Ozawa | 715/274 |
| 2001/0051963 A1* | 12/2001 | Nishikawa | 707/527 |
| 2003/0014442 A1* | 1/2003 | Shiigi et al. | 707/513 |
| 2003/0028494 A1* | 2/2003 | King et al. | 705/71 |
| 2003/0125929 A1* | 7/2003 | Bergstraesser et al. | 704/9 |
| 2005/0289462 A1* | 12/2005 | Kuroshima | 715/530 |
| 2006/0161781 A1* | 7/2006 | Rice et al. | 713/176 |
| 2006/0279769 A1* | 12/2006 | Ludwig et al. | 358/1.15 |
| 2007/0098161 A1* | 5/2007 | Ibrahim et al. | 380/55 |
| 2007/0199063 A1* | 8/2007 | Howard et al. | 726/12 |
| 2007/0283273 A1* | 12/2007 | Woods | 715/738 |
| 2008/0104493 A1* | 5/2008 | Rees et al. | 715/200 |
| 2008/0104508 A1* | 5/2008 | Lumley et al. | 715/255 |
| 2008/0235577 A1* | 9/2008 | Veluchamy et al. | 715/268 |
| 2008/0288861 A1* | 11/2008 | Jones et al. | 715/253 |
| 2009/0083848 A1* | 3/2009 | Lawlor et al. | 726/18 |
| 2009/0109460 A1* | 4/2009 | Eschbach et al. | 358/1.11 |
| 2010/0023863 A1* | 1/2010 | Cohen-Martin | 715/723 |
| 2010/0186091 A1* | 7/2010 | Turner et al. | 726/26 |

OTHER PUBLICATIONS

Fuwa et al., A Secure Printing System for Ubiquitous Network, IEEE 2007, pp. 1-5.*
Hwang et al., Document Security Language (DSL) V2.0, Google 2003, pp. 1-61.*
Abdullah et al., A Unified Architecture for the Implementation of Security Protocols, Google 2003, pp. 1-6.*
Reid, K.N. and Lin, Ku-Chin, Dynamic Behavior of Dancer Subsystems in Web Transport Systems, Proceedings of the Second International Conference on Web Handling, p. 135-146, Jun. 6-9, 1993).

* cited by examiner

*Primary Examiner* — Cong-Lac Huynh
(74) *Attorney, Agent, or Firm* — Gibb I.P. Law Firm, LLC (57) ABSTRACT

A notary processor can be dedicated to performing the security-based variable information printing. A method resolves the availability of resources required by a document template and a security map, replaces the data placeholders with dynamic data, replaces the data placeholders with the dynamic data to produce a complete, printer-ready secure document, sends the document directly to a user-specified, authorized output printing device capable of handling the security features, deletes the dynamic data and the document, and can notify the calling application of the sending of the document to the output device, all automatically and all using the dedicated notary processor.

20 Claims, 6 Drawing Sheets

```
newpath
15 772 moveto
290 772 lineto
290 435 lineto
15 435 lineto
15 772 lineto
closepath
stroke
newpath
30 507 moveto
39 507 lineto
39 498 lineto
30 498 lineto
30 507 lineto
closepath
stroke
newpath
262 462 moveto
280 462 lineto
280 444 lineto
262 444 lineto
262 462 lineto
closepath
stroke
newpath
14 434 316 773 rectclip
/DeviceGray setcolorspace
0.0 setgray
/Helvetica findfont 24 scalefont setfont
30 650 moveto
(Rx) show
/Helvetica findfont 16 scalefont setfont
30 750 moveto
(%^%DR_NAME%^%, M.D.) show
30 726 moveto
/Helvetica findfont 14 scalefont setfont
(LIC# %^%DR_LICENSE_NUMBER%^%) show
30 710 moveto
(DEA: %^%DR_DEA_NUMBER%^%#) show
30 624 moveto
(%^%DRUG_NAME%^%) show
259 464 moveto
(M.D.) show
/Helvetica findfont 10 scalefont setfont
30 690 moveto
(Name: %^%PATIENT_NAME%^%) show
30 674 moveto
(Address: %^%PATIENT_ADDRESS%^%) show
140 662 moveto
(Date: %^%DATE%^%) show
140 650 moveto
(Expires: %^%EXP_DATE%^%) show
30 610 moveto
(Instructions: %^%DRUG_INSTRUCTIONS%^%) show
48 499 moveto
(Label) show
30 480 moveto
(Refill %^%REFILLS%^% Times) show
170 480 moveto
(PRN) show
210 480 moveto
(NR) show
/Helvetica findfont 6.5 scalefont setfont
30 455 moveto
(Another brand of generically equivalent product,
identical in dosage form and) show
30 446 moveto
(content of active ingredients, may be dispensed
unless box is initialed D.A.W.) show
closepath
```

FIG. 1

%^%DR_NAME%^%, M.D.

LIC# %^%DR_LICENSE_NUMBER%^%
DEA: %^%DR_DEA_NUMBER%^%#

Name: %^%PATIENT_NAME%^%

Address: %^%PATIENT_ADDRESS%^%

Rx   Date: %^%DATE%^%
Expires: %^%EXP_DATE%^%

%^% DRUG_NAME %^%

Instructions: %^%DRUG_INSTRUCTIONS%^%

☐ Label

Refill %^%REFILLS%^% TimesPRN      NR

Another brand or generically equivalent product, identical in dosage form and content or active ingredients, may be dispensed unless box is initialed D.A.W.

```
List<SecurityElement> elements = new LinkedList<SecurityElement>();
if( includeVoidBackground == true ) {
    // arguments are x, y position, height, width, image name
    elements.add( new BackgroundImageSecurityElement( 15, 435, 0, 337, 275, "void_bg.eps" ));
}
// arguments are x, y position, orientation, length, value
elements.add( new MicroSecurityElement( 30, 724, 0, 128,
"Dr."+doctor.getName()+"-DEA#",+doctor.getDeaNumber()+"-
LICENSE#"+doctor.getLicenseNumber()+"-" ));
elements.add( new MicroSecurityElement( 30, 708, 0, 128,
"Dr."+doctor.getName()+"-DEA#",+doctor.getDeaNumber()+"-" ));
elements.add( new MicroSecurityElement( 30, 688, 0, 245,
patient.getName()+"-" ));
elements.add( new MicroSecurityElement( 30, 672, 0, 245,
patient.getAddress()+"-" ));
elements.add( new MicroSecurityElement( 140, 660, 0, 135,
prescription.getEffectiveDate()+"-" ));
elements.add( new MicroSecurityElement( 140, 648, 0, 135,
prescription.getExpirationDate()+"-" ));
elements.add( new MicroSecurityElement( 30, 622, 0, 245,
drug.getName()+"-"+drug.getStrength()+"-"+drug.getAmount()+"-" ));
elements.add( new MicroSecurityElement( 30, 478, 0, 70, +prescription.getRefills()+
"REFILLS-"+prescription.getRefills()+"-" ));
elements.add( new MicroSecurityElement( 30, 464, 0, 200,
"Dr."+doctor.getName()+"-DEA#",+doctor.getDeaNumber()+"-" ));
```

SECURING PRINTED OUTPUT

BACKGROUND AND SUMMARY

Embodiments herein generally relate to a system and method for securing printed output, and more particularly, concerns a system and method for securing printed output to prevent unauthorized copying, counterfeiting, or modification of sensitive data.

Many commonly used forms are required to be printed in a tamper-proof way. These forms are typically pre-printed and include print devices such as water marks, bar codes, and backgrounds that cannot be copied. Typically, the dynamic form data is handwritten or typed onto these pre-printed forms, and the security mechanisms embedded in the forms cannot be used to represent dynamic data.

The embodiments herein comprise a system and method for producing secure output from a printing device, such as a multi-function device (MFD), which contains dynamic security elements that represent the variable data specific to a unique form. These forms include many such security elements: backgrounds that change when copied (such as the word "VOID" or "ILLEGAL COPY" appearing in large letters on copies); micro-text, font printed so small that it appears to be solid or dashed/dotted black lines on the output, but that can be read with the aid of a magnification, and when copied on standard copiers appears smudged and illegible even under magnification; etc. With embodiments herein, the security elements contain dynamic, variable data unique to each form that can be used to verify that the form itself has not been copied or altered in any way after printing.

In view of the foregoing, apparatus embodiments are presented herein. One apparatus embodiment herein comprises a notary processor apparatus that has an input/output device that receives a document template comprising data placeholders for being populated with dynamic data, a security map comprising details of security features for the document template, and dynamic data. In addition, a storage device is operatively connected to the input/output device and automatically stores the document template, the security map, and the dynamic data. When used herein the term automatic or automatically means that a system or method performs the action without requiring any further user input and occurs as the result of some action being completed or some state being achieved.

In addition, this exemplary embodiment includes a parser (that automatically parses the document template) and a resolver device (such as a comparator or other hardware logic device capable of checking and comparing items) both of which can be operatively connected to the storage device. The resolver is operatively connected to the storage device and automatically checks the availability of resources required by the document template and the security map.

Further, this apparatus includes a replacement device (which can comprise a processor or hardware logic circuit devices, such as transistors, permanently set fuses, etc.) that is operatively connected to the storage device and automatically replaces the data placeholders with the dynamic data. The replacement device automatically checks the dynamic data to determine if data exists for each of the data placeholders. If data exists for a placeholder, the replacement device automatically replaces the data placeholder with the dynamic data and replaces the security data placeholder with the dynamic data to produce a complete, printer-ready secure document. The security features comprise background images layered beneath the document template, micro-text, and/or other similar elements layered above the document template. However, if data does not exist for the data placeholders or the security data placeholders, the replacement device either automatically removes the placeholder or automatically replaces the placeholder with default information.

The input/output device automatically sends the document directly to a user-specified, authorized output printing device capable of handling the security features. The input/output device optionally can automatically perform raster image processing on the document and/or automatically encrypt the document.

The storage device automatically deletes the dynamic data and the document after the input/output device sends the document. Further, the input/output device automatically notifies the calling application (the application that send the print job to the notary processor) of the sending of the document to the output device.

In addition, method embodiments are presented herein. One such method embodiment receives the document template (that again comprises data placeholders for being populated with the dynamic data, receives the security map (comprising the details of security features for the document template) and receives the dynamic data.

One of the features of method embodiments is the use of the notary processor, which can be dedicated to only performing the security-based variable information printing. For example, the method parses the document template, resolves the availability of resources required by the document template and the security map, replaces the data placeholders with the dynamic data, replaces the security data placeholders with the dynamic data to produce the complete, printer-ready secure document, sends the document directly to a user-specified, authorized output printing device capable of handling the security features, deletes the dynamic data and the document, and can notify the calling application of the sending of the document to the output device, all automatically and all using the dedicated notary processor, mentioned above.

The process of replacing the data placeholders comprises automatically checking the dynamic data to determine if data exists for each of the data placeholders, again using the dedicated notary processor. If data exists for a placeholder, the method automatically replaces the placeholder with the data by using the dedicated notary processor. However, if data does not exist for the placeholder, the method can automatically, using the notary processor, remove the placeholder or automatically replace the placeholder with default information, using the dedicated notary processor. When sending the document to the output device, the method can also perform raster image processing the document and/or encrypt the document, again automatically and using the dedicated notary processor.

These and other features are described in, or are apparent from, the following detailed description.

BRIEF DESCRIPTION OF THE DRAWINGS

Various exemplary embodiments of the systems and methods are described in detail below, with reference to the attached drawing figures, in which.

DETAILED DESCRIPTION

The system and method for securing printed output to prevent unauthorized copying, counterfeiting, or modification of sensitive data disclosed herein combines several elements at runtime to produce secure output. These elements are discussed as an overview in the following paragraphs.

Figure 1:
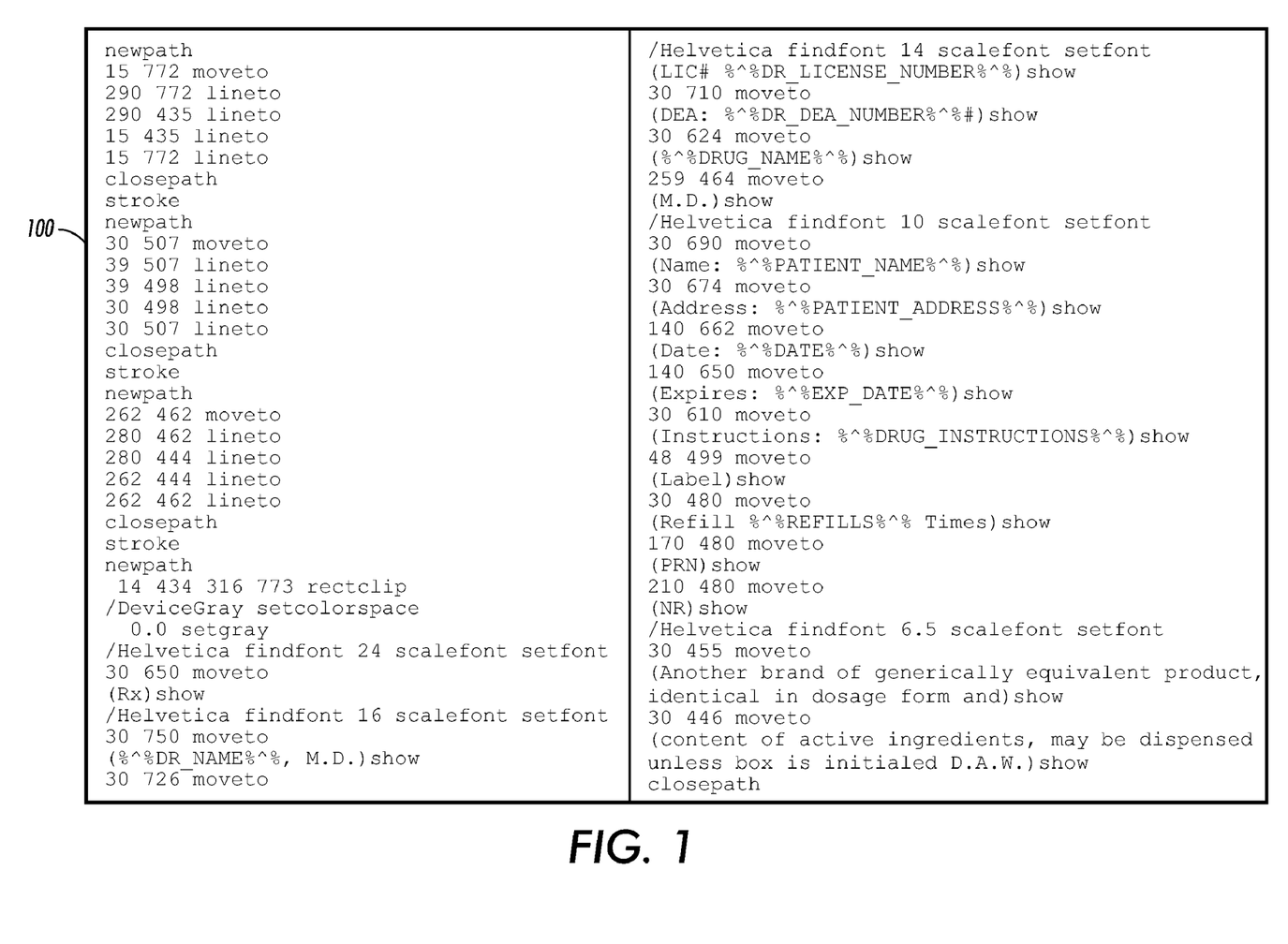
FIG. 1 is a schematic diagram of a Postscript® template for a prescription form.
Figure 2:
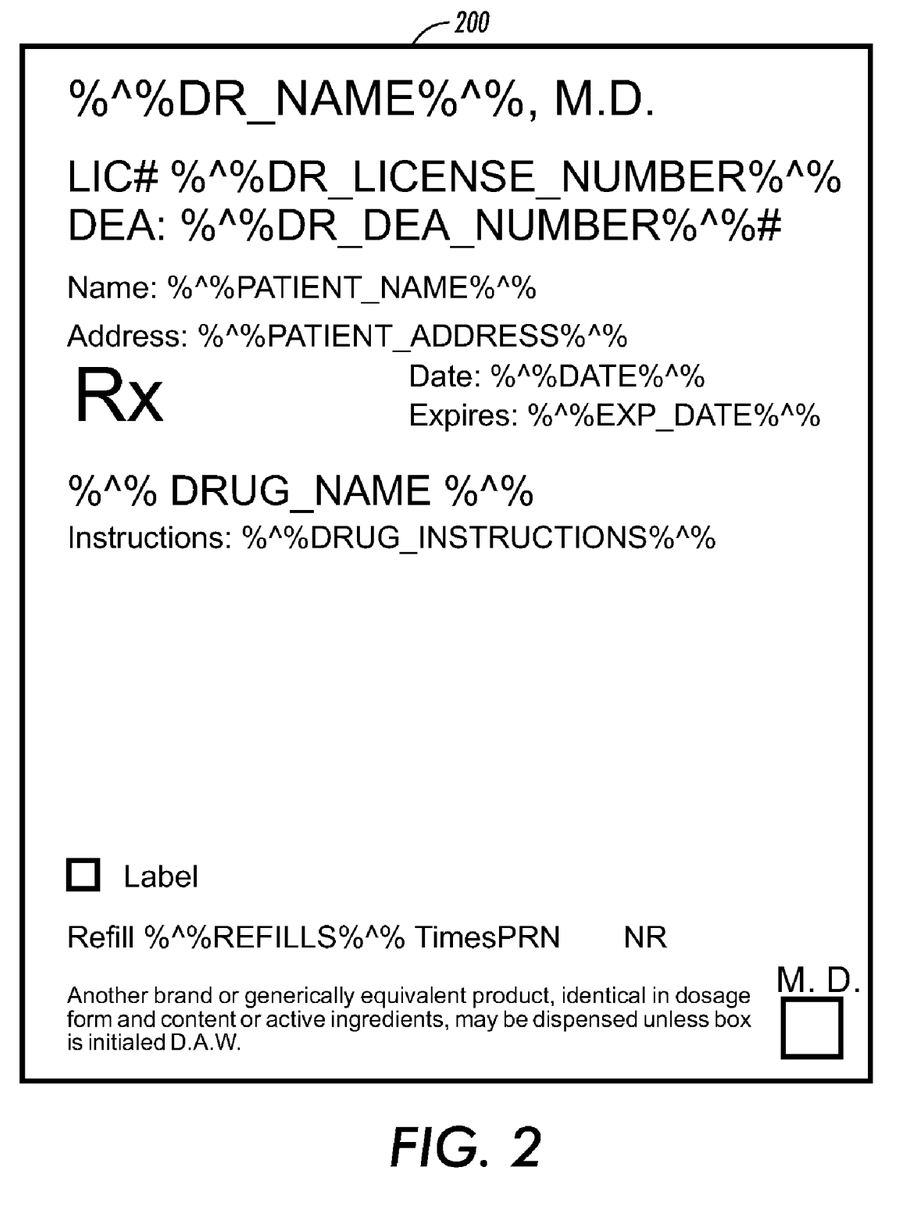
FIG. 2 is a schematic diagram of a the template shown in FIG. 1 printed directly.

One such element is a document template, an example 200 of which printed directly is shown in FIG. 2. The document template is typically written in Postscript® (available from Adobe System Incorporated, San Jose, Calif., USA) or another printer interpretable language, which contains the form to be populated with dynamic data. An example of such a template 100 for a prescription form in Postscript® is shown in FIG. 1. The template should contain all of the non-secure elements of the form including fields, labels, boxes, etc. The template also contains placeholders for variable data. For example, the position at which a patient's name may be inserted on a prescription may be represented by the string '#PATIENT_NAME#' within the template.

Figure 3:
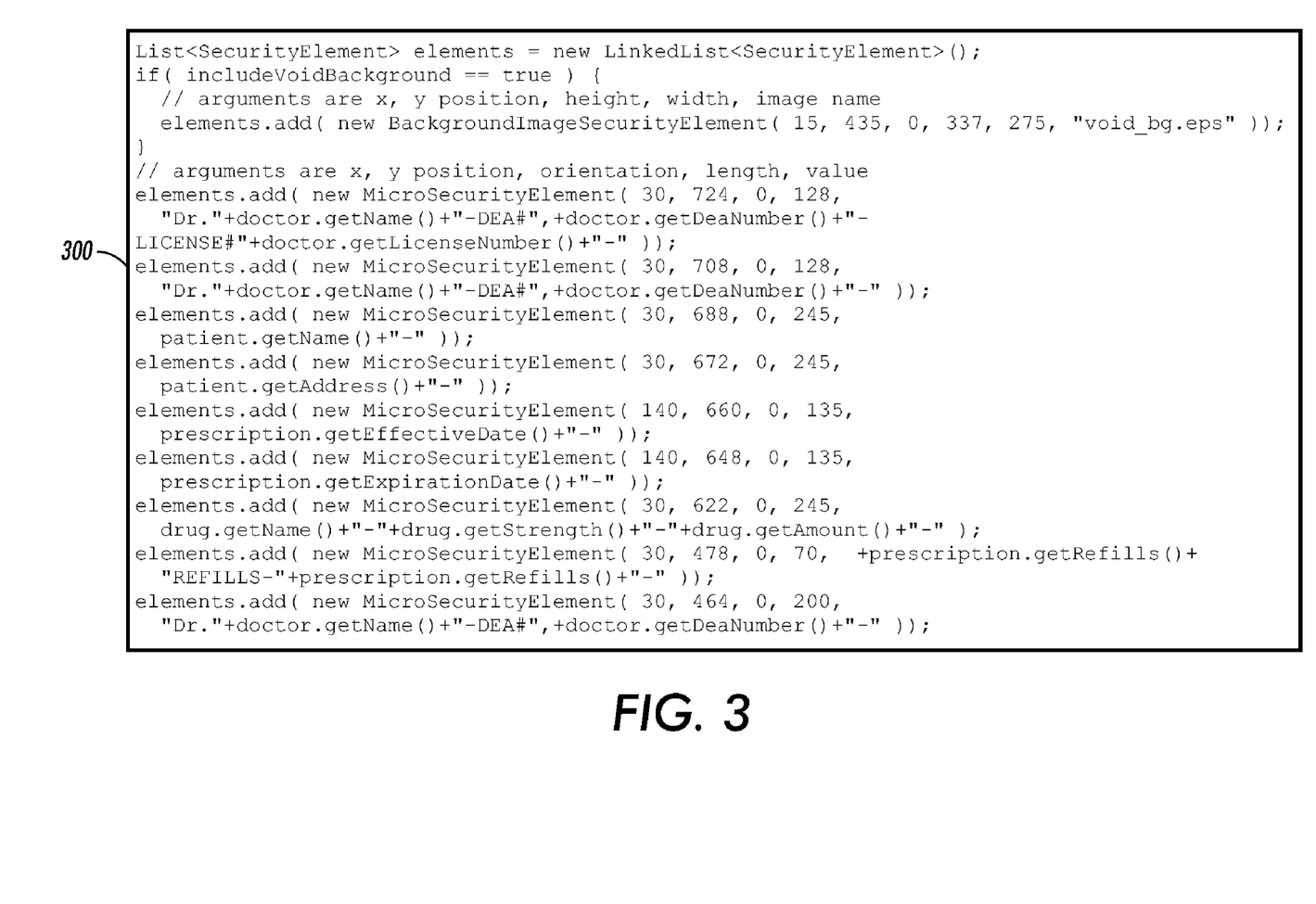
FIG. 3 is a schematic diagram of a security map for the Postscript® template for a prescription form shown in FIGS. 1 and 2.

Another element is the security map, an example of which is shown as item 300 in FIG. 3. The security map includes exact details on which security elements are to be included in the secure form and, in a similar manner to the document template, includes security data placeholders' "Dr."+doctor.getName( )+"−DEA#", +doctor.getDeaNumber( )+"−LICENSE#"+doctor.getLicenseNumber( )+"−")), etc. These details include specific locations on the form, orientation, required resources (such as font definitions, or images), size of the element on the forum, and in some cases the variable data to be included in the element.

For example, a micro-text security element would indicate the exact X,Y coordinate on the page at which the bottom left of the first character in the micro-text string should begin. The security feature or element would also include the desired total length of the string, in points, as it should appear on the final printed form. Because the data being inserted into the form is dynamic, different strings will be repeated and/or truncated in different places to reach an exact length and preserve the appearance of the final form. Finally, the micro-text security element would also include the variable data that should be used to populate the string on the form.

Another element is the dynamic form data itself. This data is the dynamic, variable data that is used to populate the template and the security map at runtime just before printing. This data would include any data that is normally handwritten or typed on a pre-printed form. Instead of placing the data on a pre-printed form, or stock, it is dynamically added to the document template, and the security elements are added, just before the output is produced.

Figure 4:
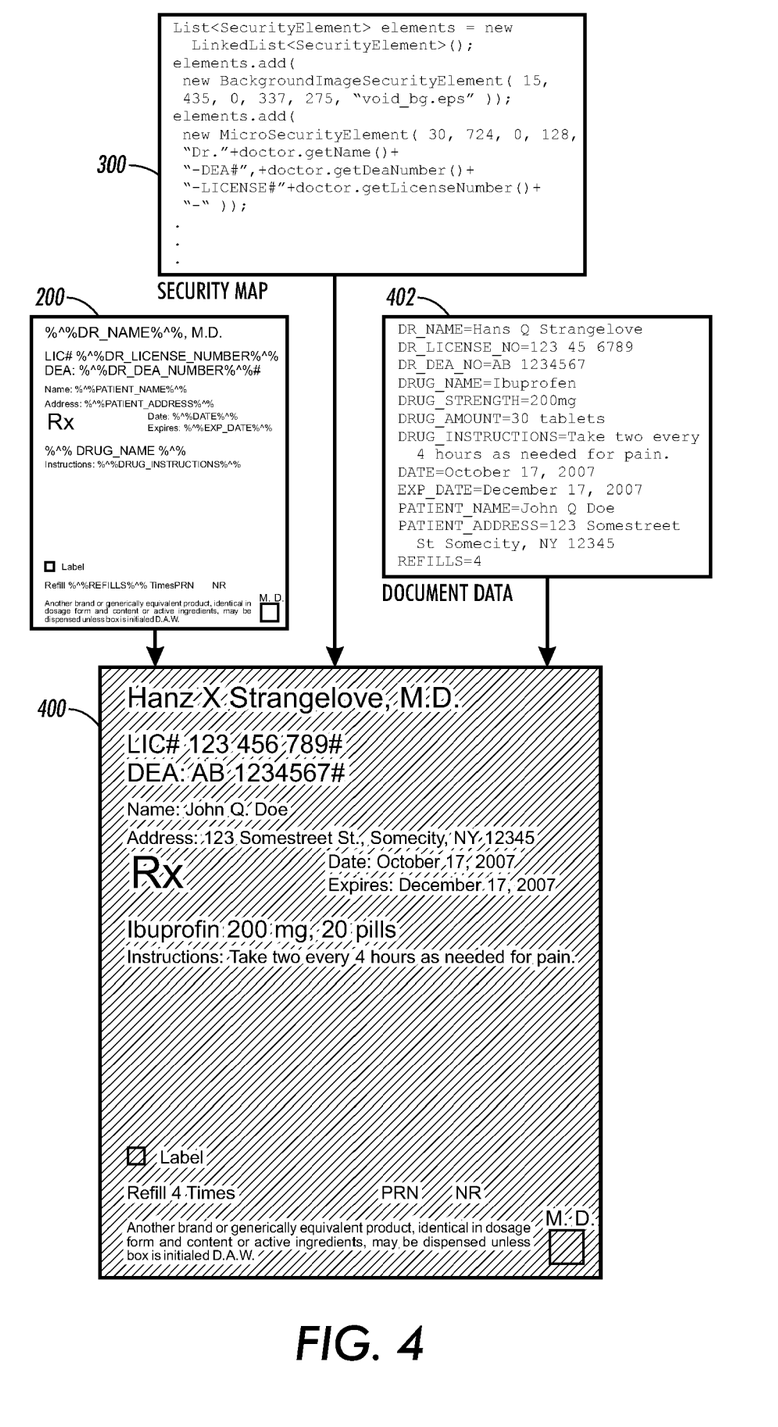
FIG. 4 is a schematic diagram showing the document produced by the combination of FIGS. 1-3.

As shown in FIG. 4, the system and method herein essentially receive these elements 200, 300, and the document data 402 and combine them to produce secure, tamper-proof output document 400 that cannot be copied or counterfeited without detection. Each produced document 400 is a unique combination of the template 200, 300 and the dynamic input 402 used to populate the template and produce the variable information security elements that are inserted into the template.

With the foregoing overview complete, a more detailed discussion of these elements follows. Secure documents are created through a multi-step process. First the document template is created. This is typically done by generating Postscript® by hand or through a form design application that produces Postscript® or another printer readable format (such as PCL or PDF). The template also includes placeholders for dynamic data, which typically take the form of keywords that uniquely identify a specific property of the document. One example of a placeholder might be 'PATIENT_FIRST_NAME', or 'DOCTOR_ADDRESS_LINE_1'.

If a template is printed directly, it should appear like the basic form, minus any security elements or variable data (the placeholders will appear in the printed form in place of the variable data). As mentioned above, a simple example of such a template, written in Postscript®, appears in FIG. 1. Note that the placeholders are identified by a delimiter, '%^%'. This delimiter is not strictly required, but makes parsing the template easier. As also mentioned above, the output produced when printing the template directly is shown in FIG. 2.

It should be noted that templates printed directly may not always be readable; placeholders may overlap or extend outside the printable area in the output. For example, the placeholder "%^%REFILLS%^%" is actually much larger than the intended input (a number, in most cases 2-digits or smaller). In cases where several such placeholders are near each other, overlapping may occur. The template is generally not meant to be printed directly for anything other than visual verification.

It should also be noted that templates do not need to be written in postscript, PCL, or another printer-readable language. They may be generated programmatically at runtime, or stored in an intermediate format (e.g. XML). Creating templates in a printer-readable format is the simplest solution, however, as the templates need only be parsed and placeholders substituted by real data (or simply removed to print the blank form).

With respect to the security maps of embodiments herein, once the template has been created, the next step is to create a security map. A security map identifies which security elements should be included in the final output. With embodiments herein, the security elements comprise placeholders and are therefore, variable information security elements.

For each security element, the position on the template, the variable data, and other information such as length, orientation, or required resources (such as fonts, special inks, and images) may also be specified. The security map is stored separately from the template, and need not be in a printer readable format; it can be translated into a printer-readable language at runtime, just before output is produced. Security maps can be built in a number of ways, i.e. programmatically (e.g. the map shown in FIG. 3), or through the use of a graphical user interface that allows elements to be chosen, and dragged onto a template.

Unlike the document template 100, it makes less sense to store security map information in a printer-readable format because the map is much less static than the basic template. For example, the precise number of characters used in a micro-text string will vary depending on the dynamic data used to populate the string, and the desired length of the string. As was mentioned previously, micro-text appears to be a solid (or sometimes dashed/dotted) line on the final output on the printed form. To maintain a consistent look and feel, such lines should always appear to be the same length on the printed form, regardless of the data being represented.

For example, a line of micro-text including the patient's name may be used to underline the full-sized patient's name on the form. The number of times that the patient's name will need to be repeated to achieve the same precise length will vary depending on the number of characters in the name.

Using a mono-spaced micro-font with characters that are 0.84 points in width (85.7 characters/inch), the name "John Q Doe" would need to be repeated approximately 44.6 times to achieve a length of 300 (about 4.2 inches) points on a printed form. The name "Jonathan X Smith", on the other hand, would only need to be repeated approximately 25.5 times to create a line of precisely the same length on the form. The exact value for such variable data is not known until immediately before producing the output, and it is therefore impossible to generate the exact print-readable code in advance.

In addition, the micro-font itself is typically stored in a secure location accessible only to authorized users (as are other protected resources, such as tamper-proof background images, water marks, glyphs, seals, etc), and are not accessed until immediately before output is generated. Creating a printer-readable version of the security map and storing it separately would have the effect of distributing copies of secure resources to potentially insecure devices, which is undesirable.

A security map may include several security elements. One such element is background images that change when copied (such as the word "VOID" or "ILLEGAL COPY" appearing in large letters on copies). Another element is micro-text font printed so small that it appears to be solid or dashed/dotted black lines on the output, but that can be read with the aid of magnification, and when copied on standard copiers appears smudged and illegible even under magnification. Images that can be viewed by infra-red cameras, but that appear to be solid black when copied are another security element, as are watermarks that identify the original copy. Further, glyphs or other machine readable data such as bar codes that contain encoded data that, when read by a computer, can verify the information on the form, can be used as security elements. Additional possible security elements include images that reside only on specific printing devices, thus verifying that the output was produced on an authorized device, and glossmark images that change appearance when viewed from different angles.

Finally, security maps are inherently layered. Background images and watermarks are added to the final output beneath the template itself, layered in the order in which they appear in the map. All other elements (including micro-text, non-background images, etc) are added to the final output above the template, layered in the order in which they appear in the map.

With respect to document data, once the template and security map have been created, the last step is collecting the dynamic document data. In the one implementation, this data is stored as a set of name/value pairs where the names correspond with placeholders in the template (and, in some cases, properties used by the security map as well). There is no specification for the format in which this data should be stored, but much like the security maps, it is most probably not stored as a printer-readable language, but instead an intermediate format such as a properties file, serialized objects, or XML.

Similarly, there is no standard on the mechanism for collecting the data. It may be stored in a database, provided at runtime through a graphical user interface, scanned in, or provided in any number of ways.

One of the features of embodiments herein is the use of a central device that automatically handles all necessary processing. This device is sometimes referred to herein as the notary. Essentially, the notary combines all of the disparate elements of the secure document into a single, printer-readable output file that is then directly printed on a user designated output device. The notary does this by performing the following tasks.

The notary attempts to resolve (check availability of) all required resources before processing the secure form. For example, if the secure form includes micro-text security elements, the notary verifies that the required micro-font is present and can be accessed by the user requesting the form. Similarly, the notary verifies that all required image and other resources are present before processing the secure form.

The notary parses the template and replaces any placeholders with dynamic document data. For each placeholder the notary checks the document data to determine if there is a property with the same name; if so the placeholder is replaced with the dynamic document data; if not the placeholder is simply removed and appears blank on the final printed form. Where design considerations require marks at the placeholder location, default information may be provided.

For each security element, the notary includes the required resources (fonts, images, etc) in the printer-readable output. The notary then adds each security elements to the template in the appropriate location (background images layered beneath the template, micro-text and other elements layered above the template).

The notary temporarily stores the complete, printer-ready secure form and sends it directly to a user-specified, authorized output device capable of handling the security elements (which typically require 600 dpi resolution or higher, special inks, and color print capabilities, as well as some special software requirements). To protect secure resources such as images or microtext fonts, the notary may also raster image process (RIP) the form before sending it to the output device or may encrypt the data stream.

Finally, the notary cleans up all temporary resources, and notifies the calling application of the success/failure of the process. The secure form is not permanently stored. Also, the secure documents are intended to be printed. To insure that the forms do not fall into the wrong hand, steps should be taken to protect the final output. Such steps include using devices, such as Xerox Secure Print (available from Xerox Corporation, Norwalk, Conn., USA) which select an output by logging on to the machine. In addition, the output should be limited to physically secure print devices. For example, all prescriptions may be printed only in the pharmacy or only at the printer directly connected to the physicians input device. Further, controlled access should be provided to the notary from the device user interface (UI) for authorized people to print.

Figure 5:
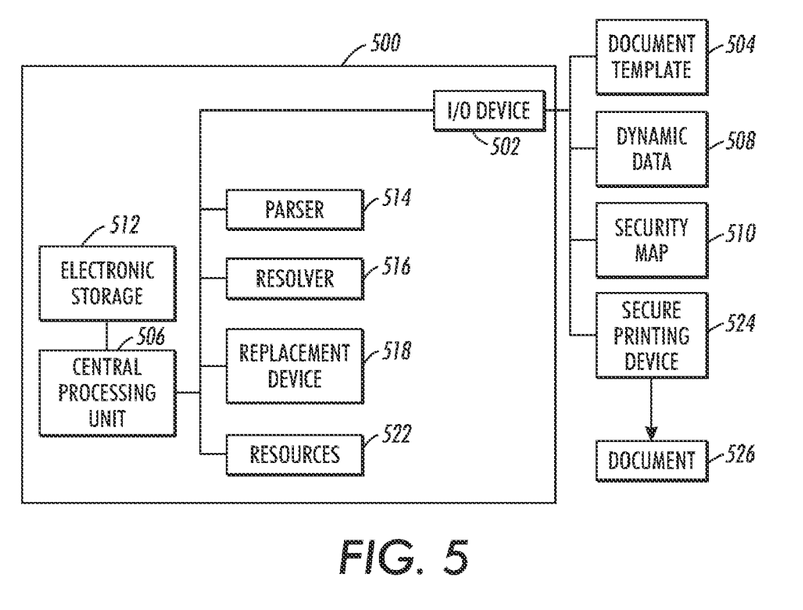
FIG. 5 is a schematic diagram of a system embodiment herein.

Thus, various apparatus embodiments are contemplated herein. One exemplary apparatus embodiment herein is shown schematically in FIG. 5 and comprises the notary processor apparatus 500 that has an input/output device 502 that receives a document template 504 comprising data placeholders for being populated with dynamic data 508, a security map 510 comprising details of security features for the document template 504, and dynamic data 508. The devices shown in FIG. 5 are items of physical hardware and can be contained within a single machine or can be separate elements connected by a local or wide are network.

In addition, a storage device 512 is operatively connected to the input/output device 502 through a central processing unit (CPU) 506 and automatically stores the document template 504, the security map 510, and the dynamic data 508. The storage device 512 can also store the necessary resources (such as font definitions, or images). When used herein the terms automatic or automatically means that a system or method performs the action without requiring any further user input and is performed by a machine or computerized device as the result of some action being completed or some state being achieved. In addition, this exemplary embodiment includes a parser 514 (that automatically parses the document template 504) and a resolver 516 device (such as a comparator or other hardware logic device capable of checking and comparing items) both of which can be operatively connected to the storage device 512 through the CPU 506. The resolver 516 automatically checks the availability of resources 522 required by the document template 504 and the security map 510.

Further, this apparatus includes a replacement device 518 (which can comprise a processor or hardware logic circuit devices, such as transistors, permanently set fuses, etc.) that is operatively connected to the storage device 512 and automatically replaces the data placeholders with the dynamic data 508. The replacement device 518 automatically checks the dynamic data 508 to determine if data exists for each of the security and data placeholders. If data exists for a placeholder, the replacement device 518 automatically replaces the placeholder with the data. However, if data does not exist for a given placeholder, the replacement device 518 either automatically removes the placeholder or automatically replaces the placeholder with default information. By replacing the security and data placeholders with data or default information, the replacement device 518 produces a complete, printer-ready secure document 526. The security features comprise background images layered beneath the document template 504, micro-text, and/or other similar elements layered above the document template 504.

The input/output device 502 automatically sends the document 526 directly to a user-specified, authorized output printing device 524 capable of handling the security features. The input/output device 502 optionally can automatically perform raster image processing on the document 526 and/or automatically encrypt the document 526.

The storage device 512 automatically deletes the dynamic data 508 and the document 526 after the input/output device 502 sends the document 526. Further, the input/output device 502 automatically notifies the calling application (the application that send the print job to the notary processor 500) of the sending of the document 526 to the output device.

Figure 6:
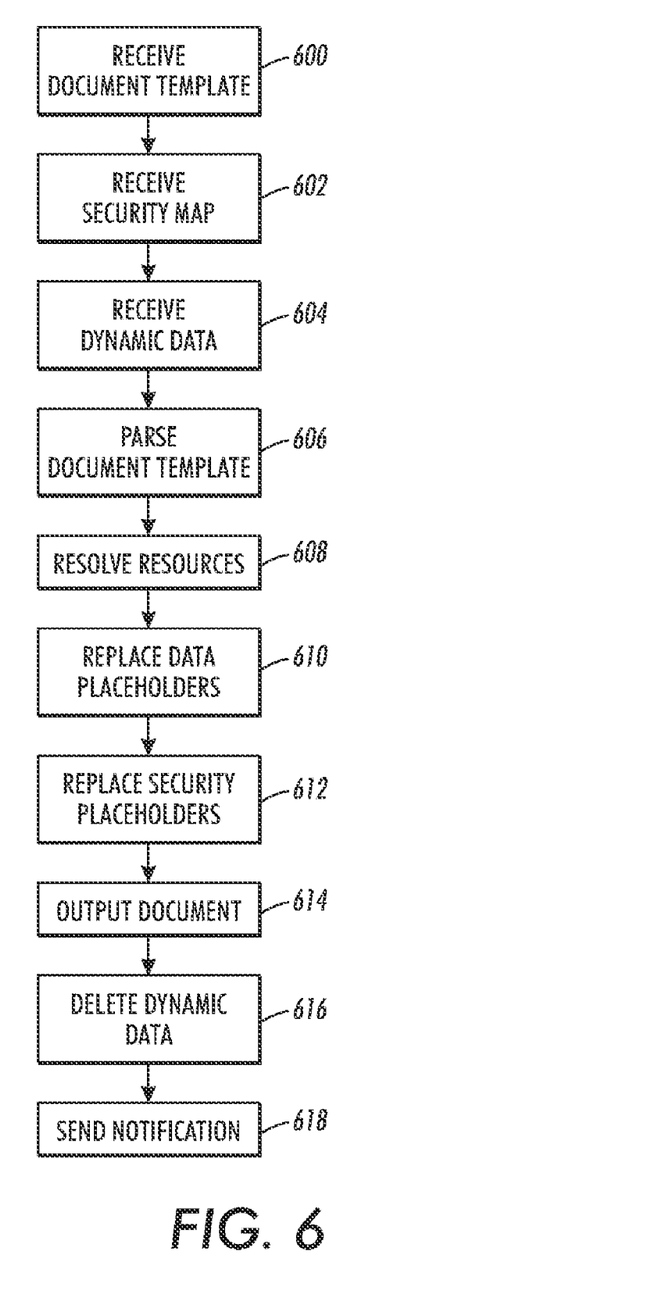
FIG. 6 is a flow diagram illustrating embodiments herein.

In addition, as shown in flowchart form in FIG. 6, various method embodiments are presented herein. One such method embodiment receives the document template 504 in item 600 (that again comprises data placeholders for being populated with the dynamic data 508, receives the security map 510 in item 602 (comprising the details of security features for the document template 504) and receives the dynamic data 508 in item 604.

One of the features of method embodiments is the use of the notary processor 500, which can be dedicated to only performing the security-based variable information printing or can be used for other purposes. For example, the method parses the document template 504 (in item 606), resolves the availability of resources 522 required by the document template 504 and the security map 510 (in item 608), replaces the data placeholders with the dynamic data 508 (in item 610), replaces the security data placeholders with the dynamic data 508 to produce the complete, printer-ready secure document 526 (in item 612), sends the document 526 directly to a user-specified, authorized output printing device 524 capable of handling the security features (in item 614), deletes the dynamic data 508 and the document 526 (in item 616), and can notify the calling application of the sending of the document 526 to the output device (in item 618), all automatically and all using the dedicated notary processor 500, mentioned above.

The process of replacing the data placeholders 610 comprises automatically checking the dynamic data 508 to determine if data exists for each of the data placeholders, again using the dedicated notary processor 500. If data exists for a placeholder, item 610 automatically replaces the placeholder with the data by using the dedicated notary processor 500. However, if data does not exist for the placeholder, item 610 can automatically, using the notary processor 500, remove the placeholder or automatically replace the placeholder with default information, using the dedicated notary processor 500. When sending the document 526 to the output device in item 614, the method can also perform raster image processing the document 526 and/or encrypt the document 526, again automatically and using the dedicated notary processor 500.

Many computerized devices and printers are discussed above. Many forms of printing devices are currently available from manufactures such as Xerox Corporation, Norwalk, Conn., USA. Computerized devices that include chip-based central processing units (CPU's), input/output device 502s (including graphic user interfaces (GUI), memories, comparators, processors, etc. are well-known and readily available devices produced by manufactures such as International Business Machines Corporation, Armonk N.Y., USA and Apple Computer Co., Cupertino Calif., USA. Such computerized devices and printers commonly include input/output devices, power supplies, processors, electronic storage memories, wiring, etc., the details of which are omitted herefrom to allow the reader to focus on the salient aspects of the embodiments described herein.

The words printer, printing device, output device, etc., as used herein encompasses any apparatus, such as a digital copier, bookmaking machine, facsimile machine, multi-function machine, etc. which performs a print outputting function for any purpose. The details of printers, printing engines, etc. are well-known by those ordinarily skilled in the art and are discussed in, for example, U.S. Pat. No. 6,032,004, the complete disclosure of which is fully incorporated herein by reference. The embodiments herein can encompass embodiments that print in color, monochrome, or handle color or monochrome image data. All foregoing embodiments are specifically applicable to electrostatographic and/or xerographic machines and/or processes.

Therefore, as shown above, the embodiments herein comprise a system and method that uses a centralized notary to perform all necessary steps for producing secure output from a printing device, which contains dynamic security elements that represent variable data specific to a unique form. With embodiments herein, the security elements contain dynamic, variable data unique to each form that can be used to verify that the form itself has not been copied or altered in any way after printing. Therefore, the embodiments herein increase the level of security of such documents and provide a centralized processor to make operations more secure, easier, and more efficient.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. The claims can encompass embodiments in hardware, software, and/or a combination thereof. Unless specifically defined in a specific claim itself, steps or components of the invention should not be implied or imported from any above example as limitations to any particular order, number, position, size, shape, angle, color, or material.

What is claimed is:

1. A method comprising:
   receiving a document template comprising data placeholders;
   receiving a security map comprising details of security features for said document template, said security features comprising security data placeholders unique to said document template;
   receiving dynamic data, said dynamic data comprising variable information;
   parsing said document template;
   replacing said data placeholders of said document template with said dynamic data along with replacing said security data placeholders in said security map with at least a portion of said dynamic data to create a secure document;
   producing a complete, printer-ready secure document from said document template; and
   sending said secure document directly to a user-specified, authorized output printing device capable of handling said security features.

2. The method according to claim 1, wherein said replacing of said data placeholders comprises:
   checking said dynamic data to determine if data exists for each of said data placeholders;
   if data exists for a placeholder, replacing said placeholder with said data; and
   if data does not exist for said placeholder, either:
      removing said placeholder; or
      replacing said placeholder with default information.

3. The method according to claim 1, wherein said security features comprise at least one of background images layered beneath said document template, micro-text, and other elements layered above said document template.

4. The method according to claim 1, wherein said sending of said document comprises
   raster image processing said document or encrypting said document.

5. The method according to claim 1, further comprising, after sending said secure document directly to an output printing device, deleting said dynamic data and said document.

6. A method comprising:
   receiving a document template comprising data placeholders;
   receiving a security map comprising details of security features for said document template;
   receiving dynamic data, said dynamic data comprising variable information;
   parsing said document template using a dedicated notary processor;
   automatically replacing said data placeholders of said document template with said dynamic data along with automatically replacing said security data placeholders in said security map with at least a portion of said dynamic data using said dedicated notary processor to create a secure document;
   producing a complete, printer-ready secure document from said document template using said dedicated notary processor; and
   automatically sending said secure document directly to a user-specified, authorized output printing device capable of handling said security features, using said dedicated notary processor.

7. The method according to claim 6, wherein said replacing of said data placeholders comprises:
   automatically checking said dynamic data to determine if data exists for each of said data placeholders, using said dedicated notary processor; and
   if data exists for a placeholder, automatically replacing said placeholder with said data, using said dedicated notary processor;
   if data does not exist for said placeholder, either:
      automatically removing said placeholder, using said dedicated notary processor; or
      automatically replacing said placeholder with default information, using said dedicated notary processor.

8. The method according to claim 6, wherein said security features comprise at least one of background images layered beneath said document template, micro-text, and other elements layered above said document template.

9. The method according to claim 6, wherein said automatically sending of said document comprises
   automatically raster image processing said document, using said dedicated notary processor or
   automatically encrypting said document, using said dedicated notary processor.

10. The method according to claim 6, further comprising, after automatically sending said secure document directly to an output printing device, automatically deleting said dynamic data and said document, using said dedicated notary processor.

11. A notary processor apparatus comprising:
    an input/output device that receives:
       a document template comprising data placeholders,
       a security map comprising details of security features for said document template, and
       dynamic data, said dynamic data comprising variable information;
    a storage device connected to said input/output device that stores said document template, said security map, and said dynamic data;
    a resolver device connected to said storage device that checks availability of resources required by said document template and said security map; and
    a replacement device connected to said storage device that replaces said data placeholders of said document template with said dynamic data and replaces said security data placeholders in said security map with at least a portion of said dynamic data thereby producing a complete, printer-ready secure document;
    wherein said secure document is sent directly to a user-specified, authorized output printing device capable of handling said security features by said input/output device.

12. The apparatus according to claim 11, wherein said replacement device checks said dynamic data to determine if data exists for each of said data placeholders,
    if data exists for a placeholder, said replacement device replaces said placeholder with said data, and
    if data does not exist for said placeholder, said replacement device either:
       removes said placeholder, or
       replaces said placeholder with default information.

13. The apparatus according to claim 11, said security features comprising at least one of background images layered beneath said document template, micro-text, and other elements layered above said document template.

14. The apparatus according to claim 11, said input/output device either:
   performs raster image processing on said document; or
   encrypts said document.

15. The apparatus according to claim 11, further comprising, a parser operatively connected to said storage device that parses said document template.

16. A notary processor apparatus comprising:
   an input/output device that receives:
      a document template comprising data placeholders,
      a security map comprising details of security features for said document template, and
      dynamic data, said dynamic data comprising variable information;
   a storage device connected to said input/output device that automatically stores said document template, said security map, and said dynamic data;
   a resolver device connected to said storage device that checks availability of resources required by said document template and said security map; and
   a replacement device connected to said storage device that replaces said data placeholders of said document template with said dynamic data and replaces said security data placeholders in said security map with at least a portion of said dynamic data thereby producing a complete, printer-ready secure document;
   wherein said secure document is automatically sent directly to a user-specified, authorized output printing device capable of handling said security features by said input/output device.

17. The apparatus according to claim 16, wherein said replacement device automatically checks said dynamic data to determine if data exists for each of said data placeholders,
   if data exists for a placeholder, said replacement device automatically replaces said placeholder with said data, and
   if data does not exist for said placeholder, said replacement device either:
      automatically removes said placeholder, or
      automatically replaces said placeholder with default information.

18. The apparatus according to claim 16, said input/output device either:
   automatically performs raster image processing on said document; or
   automatically encrypts said document.

19. The apparatus according to claim 16, further comprising, a parser operatively connected to said storage device that automatically parses said document template.

20. A computer program product comprising:
   a computer-usable data storage medium storing instructions that, when executed by a computer, cause the computer to perform a method comprising:
      receiving a document template comprising data placeholders;
      receiving a security map comprising details of security features for said document template;
      receiving dynamic data, said dynamic data comprising variable information;
      automatically resolving availability of resources required by said document template and said security map;
      automatically replacing said data placeholders of said document template with said dynamic data along with automatically replacing said security data placeholders in said security map with at least a portion of said dynamic data to create a secure document;
      automatically producing a complete, printer-ready secure document from said document template; and
      automatically sending said secure document directly to a user-specified, authorized output printing device capable of handling said security features.

* * * * *